(12) United States Patent
Nogi et al.

(10) Patent No.: US 9,616,770 B2
(45) Date of Patent: Apr. 11, 2017

(54) ELECTRIC VEHICLE DRIVE APPARATUS, METHOD OF DRIVING AN ELECTRIC VEHICLE, AND PROGRAM

(71) Applicant: KABUSHIKI KAISHA TOSHIBA, Minato-ku, Tokyo (JP)

(72) Inventors: Masayuki Nogi, Hachioji Tokyo (JP); Shun Taniguchi, Fuchu Tokyo (JP); Yosuke Nakazawa, Kunitachi Tokyo (JP); Jin Kato, Saitama Saitama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 15/081,422

(22) Filed: Mar. 25, 2016

(65) Prior Publication Data

US 2016/0207421 A1   Jul. 21, 2016

Related U.S. Application Data

(63) Continuation-in-part of application No. PCT/JP2014/064830, filed on Jun. 4, 2014.

(30) Foreign Application Priority Data

Sep. 30, 2013   (JP) .................................. 2013-204633

(51) Int. Cl.
*B60L 15/20* (2006.01)
*B60L 7/28* (2006.01)
(Continued)

(52) U.S. Cl.
CPC .............. *B60L 15/20* (2013.01); *B60L 3/0061* (2013.01); *B60L 3/0084* (2013.01); *B60L 3/102* (2013.01);
(Continued)

(58) Field of Classification Search
CPC ........ B60T 1/14; Y02T 10/648; F16D 63/008; B60W 20/10; B60W 10/08; B60W 10/06;
(Continued)

(56) References Cited

U.S. PATENT DOCUMENTS

2010/0252340 A1   10/2010   Gurol et al.
2011/0238251 A1*   9/2011   Wright .................... B60L 15/20
                                                              701/22

FOREIGN PATENT DOCUMENTS

JP          61189101 A      8/1986
JP          03293904 A     12/1991
(Continued)

OTHER PUBLICATIONS

International Search Report (ISR) dated Sep. 9, 2014 issued in International Application No. PCT/JP2014/064830.

*Primary Examiner* — Yuen Wong
(74) *Attorney, Agent, or Firm* — Holtz, Holtz & Volek PC (57) ABSTRACT

An embodiment of an electric vehicle drive apparatus includes a rotary electric motor, an electromagnet apparatus, an electric motor controller, and an electromagnet controller. The rotary electric motor drives at least one wheel. The electromagnet controller generates at least one of an attraction force between a rail and a bogie, and a propulsion force. The electromagnet controller controls the electromagnet apparatus. The rotary electric motor and the electromagnet apparatus are provided on the same bogie.

16 Claims, 5 Drawing Sheets

(51) Int. Cl.
- *B60L 9/30* (2006.01)
- *B60L 11/14* (2006.01)
- *B60L 13/03* (2006.01)
- *B60T 1/14* (2006.01)
- *B61H 7/08* (2006.01)
- *F16D 63/00* (2006.01)
- *B60L 3/00* (2006.01)
- *B60L 3/10* (2006.01)
- *B61C 3/00* (2006.01)
- *B61C 15/00* (2006.01)
- *B61F 5/38* (2006.01)
- *H02P 29/60* (2016.01)
- *B60W 10/06* (2006.01)
- *B60W 10/08* (2006.01)
- *B60W 20/10* (2016.01)
- *H02P 6/08* (2016.01)
- *H02P 25/062* (2016.01)

(52) U.S. Cl.
CPC ............... *B60L 3/106* (2013.01); *B60L 7/28* (2013.01); *B60L 9/30* (2013.01); *B60L 11/14* (2013.01); *B60L 13/03* (2013.01); *B60L 15/2045* (2013.01); *B60T 1/14* (2013.01); *B60W 10/06* (2013.01); *B60W 10/08* (2013.01); *B60W 20/10* (2013.01); *B61C 3/00* (2013.01); *B61C 15/00* (2013.01); *B61F 5/383* (2013.01); *B61H 7/08* (2013.01); *F16D 63/008* (2013.01); *H02P 6/08* (2013.01); *H02P 25/062* (2016.02); *H02P 29/60* (2016.02); *B60L 2200/26* (2013.01); *B60L 2220/42* (2013.01); *B60L 2220/46* (2013.01); *B60L 2240/12* (2013.01); *B60L 2240/423* (2013.01); *B60L 2240/443* (2013.01); *B60L 2240/465* (2013.01); *Y02T 10/648* (2013.01); *Y02T 10/70* (2013.01); *Y02T 10/7283* (2013.01); *Y02T 30/10* (2013.01); *Y10S 903/906* (2013.01); *Y10S 903/93* (2013.01)

(58) Field of Classification Search
CPC .......... H02P 29/60; H02P 25/062; H02P 6/08; Y10S 903/93; Y10S 903/906; B60L 3/0061; B60L 3/0084; B60L 3/102; B60L 7/28; B60L 9/30; B60L 11/14; B60L 13/03; B60L 15/20
See application file for complete search history.

(56) References Cited

FOREIGN PATENT DOCUMENTS

| | | |
|---|---|---|
| JP | 07216842 A | 8/1995 |
| JP | 2005271704 A | 10/2005 |
| JP | 2006014394 A | 1/2006 |
| JP | 2006199170 A | 8/2006 |
| JP | 2006304464 A | 11/2006 |
| JP | 2007068241 A | 3/2007 |
| JP | 2009006750 A | 1/2009 |
| JP | 2010069950 A | 4/2010 |
| JP | 2010239683 A | 10/2010 |
| JP | 2012523213 A | 9/2012 |
| WO | 2010114656 A1 | 10/2010 |

* cited by examiner

ELECTRIC VEHICLE DRIVE APPARATUS, METHOD OF DRIVING AN ELECTRIC VEHICLE, AND PROGRAM

TECHNICAL FIELD

Embodiments of the present invention relate to an electric vehicle drive apparatus, a method of driving an electric vehicle, and a program.

BACKGROUND

The rolling resistance of an electric vehicle that travels by using a ferric wheel on a rail is low. The rolling resistance of an electric vehicle is thus low compared to an automobile. For this reason, electric vehicle systems are known as energy conserving transport systems. However, there is little friction between a rail and a ferric wheel, and slippage easily occurs. A variety of techniques related to braking have been proposed for this type of electric vehicle where slippage easily occurs due to low friction between a rail and a ferric wheel.

PRIOR ART

Patent Documents

[PATENT DOCUMENT 1] Japanese Patent Application Laid-Open Publication 2005-271704
[PATENT DOCUMENT 2] Japanese Patent Application Laid-Open Publication 2006-14394
[PATENT DOCUMENT 3] Japanese Patent Application Laid-Open Publication 2006-199170
[PATENT DOCUMENT 4] Japanese Patent Application Laid-Open Publication 2010-239683.

SUMMARY

There is a danger that an electric vehicle, which may slip easily due to low friction between a rail and a ferric wheel, may experience wheel spin or slippage due to a variety of conditions, such as the type of terrain over which the vehicle is traveling, weather, and the like.

The present invention provides an electric vehicle drive apparatus, a method of driving an electric vehicle, and a program, for controlling electric vehicle wheel spin and slippage, and for imparting a propulsion force to an electric vehicle in a direction of travel.

An embodiment of an electric vehicle drive apparatus includes a rotary electric motor, an electromagnet apparatus, an electric motor controller, and an electromagnet controller. The rotary electric motor drives at least one wheel. The electromagnet controller generates at least one of an attraction force between a rail and a bogie, and a propulsion force. The electromagnet controller controls the electromagnet apparatus. The rotary electric motor and the electromagnet apparatus are provided on the same bogie.

DETAILED DESCRIPTION

An electric vehicle drive apparatus 10 according to a first embodiment, and a bogie 100 on which the electric vehicle drive apparatus 10 is provided, are described below with reference to the attached drawings.

Figure 1:
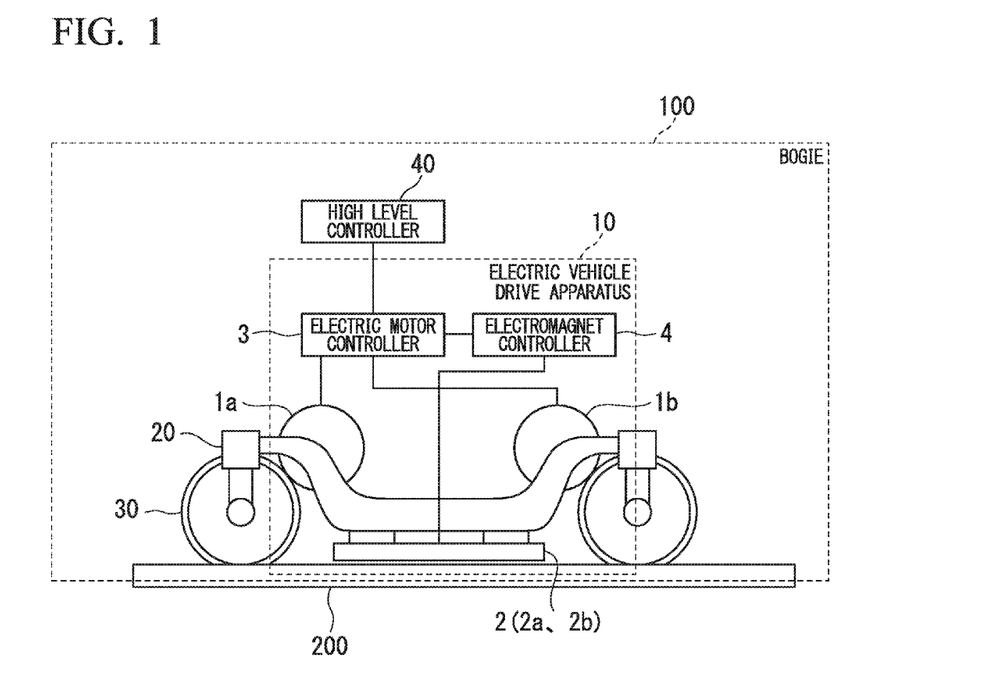
FIG. 1 is a diagram illustrating an example of a bogie 100 on which an electric vehicle drive apparatus 10 according to a first embodiment is provided.

FIG. 1 is a diagram illustrating an example of the bogie 100 on which the electric vehicle drive apparatus 10 according to the first embodiment is provided.

As FIG. 1 illustrates, the bogie 100 is provided with the electric vehicle drive apparatus 10, a bogie frame 20, wheels 30, and a high level controller 40. A rail 200 is also shown in FIG. 1 along with the bogie 100.

The electric vehicle drive apparatus 10 is provided with a rotary electric motor 1 (rotary electric motors 1a and 1b), an electromagnet apparatus 2 (electromagnet apparatuses 2a and 2b), an electric motor controller 3, and an electromagnet controller 4.

The rotary motor 1 is a functional portion that drives the wheels 30. For example, the rotary motor 1 is an induction motor or a permanent magnet synchronous motor. The rotary motor 1 transmits a torque to the wheels 30 by directly driving a wheel axle, or through a gear apparatus.

The electromagnet apparatus 2 is provided suspended from the bogie frame 20 between the wheels 30. The electromagnet apparatus 2 is a functional portion that generates at least an attraction force between the rail 200 and the bogie 100, or a propulsion force in a direction of travel. The electromagnet apparatus 2 may correspond, for example, to a primary side of a linear induction motor that uses the rail 200 as a secondary conductor.

The electric motor controller 3 is a functional portion that controls the rotary electric motor 1. For example, when the rotary electric motor 1 is an induction motor, the electric motor controller 3 is provided with an inverter circuit for driving the induction motor and a control operation portion for controlling the inverter circuit.

The electromagnet controller 4 is a functional portion for controlling the electromagnet apparatus 2. For example, when the electromagnet apparatus 2 is a linear induction motor using the rail 200 as a secondary conductor, the electromagnet controller 4 is provided with an inverter circuit for propulsion control of the linear induction motor, and a control operation portion for controlling a torque generated by the linear induction motor, and an attraction force between the rail 200 and the bogie 100.

The electric motor controller 3 and the electromagnet controller 4 are shown as separate controllers in FIG. 1, but there are no limitations placed thereupon. Any type of controller capable of achieving equivalent functionality may also be used as a substitute for the separate electric motor controller 3 and electromagnet controller 4.

The bogie frame 20 is a component disposed between a wheel and axle (a construction of the wheels 30 and axles) and a vehicle body, and supports all loads such as the vehicle body and the like. The bogie frame 20 is typically a welded structure that uses a steel material such as a rolled steel plate or steel tubing. In addition to a static load due to the vehicle body and the like, dynamic loads due to vibrations, driving, and control during travel also act on the bogie frame 20.

The wheels 30 are components that play a role in supporting a vehicle and driving the vehicle on the rail 200. The wheels 30 are typically made of steel. Advantages of using steel for the wheels 30 include the wheels 30 being capable of supporting a heavier vehicle weight compared to rubber tires, and a lower rolling friction when combined with a rail made from steel. Disadvantages of using steel for the wheels 30 include a low coefficient of friction between the rail 200 and the wheels 30 because both are made from steel, and that wheel spin and slippage may easily occur.

The high level controller 40 is a functional portion that outputs commands to the electric motor controller 3 and to the electromagnet controller 4. For example, the high level controller 40 may output a powering command for performing formation control or a braking command to the electric motor controller 3 or the electromagnet controller 4. Note that the specific content of powering commands and braking commands output by the high level controller 40 may be notch commands, torque commands, and the like.

Operation during powering of the electric vehicle drive apparatus 10 according to the first embodiment is explained. The electromagnet apparatus 2 corresponds to a primary exciting coil of a linear induction motor ("LIM") that uses the rail 200 as a secondary conductor.

First, a powering command from the high level controller 40 causes control portions of the electric motor controller 3 and the electromagnet controller 4 to output electric current to the rotary electric motor 1 and to the electromagnet apparatus 2 to provide a powering action.

For example, the electromagnet controller 3 may change the frequency of a voltage output from an inverter circuit to the rotary electric motor 1 in order to control a torque of the rotary electric motor 1.

EQ. 1 is an equation that expresses a relationship between torque, voltage, frequency, and slippage.

$$T = K \times I_d \times f_s \times (V \div f) \quad \text{(EQ. 1)}$$

In EQ. 1, T denotes torque, K denotes a characteristic constant of the rotary electric motor 1, $I_d$ denotes an exciting current that flows in a coil, and $f_s$ denotes a slippage frequency. V denotes a voltage supplied from an inverter circuit to the rotary electric motor 1, and f denotes a rotation frequency of the rotary electric motor 1.

The wheels 30 and the rail 200 are made from steel, and friction between a tread surface of the wheels 30 when rotating and the rail 200 due to torque is thus extremely small when the rotary electric motor 1 transmits torque to the wheels 30. Therefore adhesion between the wheels 30 and the rail 200 is weak, and the wheels are in a state where wheel spin or slippage easily occurs.

A case of wheel spin occurring in the wheels due to a torque generated by the rotary electric motor 1 is considered here as a specific example.

Two methods of controlling wheel spin and achieving a necessary traction force when the wheels 30 slip due to a torque generated by the rotary electric motor 1 are shown.

A case of using the electric vehicle drive apparatus 10 of the first embodiment to control the occurrence of wheel spin and slippage of the wheels 30, and to assist a propulsion force in the direction of travel, is explained as a first method.

First, a method where an inverter circuit detects wheel spin of the wheels 30 is explained. The inverter circuit drives the rotary electric motor 1 provided to the electric motor controller 3. Note that in this case the inverter circuit is a wheel state detector.

The electric motor controller 3 acquires a rotational speed of the rotary electric motor 1. Specifically, the rotational speed may be detected by using a pulse generator or a resolver used as an electric motor rotational speed detector portion, and may also be detected by using an electric current flowing in the electric motor. When an inverter circuit provided to the electric motor controller 3 activates the rotary electric motor 1, the rotational speed is increased by an acceleration corresponding to electric motor torque before the wheels 30 experience wheel spin. However, if the adhesion limit between the wheels 30 and the rail 200 is exceeded, the wheels will spin. The rotational speed of the wheels 30 increases suddenly at the instant that wheel spin begins. For example, the electric motor controller 3 may detect the time differential value of the rotation speed for a sudden increase. That is, the electric motor controller 3 may also detect the time derivative of acceleration (jerk). By monitoring changes in the jerk value, wheel spin of the wheels 30 can be detected. Further, if a groundspeed detector is provided and speed is obtained using the groundspeed detector, wheel spin and slippage of the wheels may also be detected by using a difference between the groundspeed and a vehicle speed obtained by conversion of the wheel rotation speed.

Note that although a method of detecting wheel slip of the wheels 30 is explained here, detection of wheel ship of the wheels 30 is not limited to the method shown. Any other method capable of detecting wheel spin of the wheels 30 may also be used.

Next, the electric motor controller 3 may control wheel spin of the wheels 30 by reducing the rotational speed of the rotary electric motor 1 through controlling a torque generated by the rotary electric motor 1 when wheel spin of the wheels 30 is detected. At this point the electric motor controller 3 finds the current torque size from a relationship between the rotational speed of the rotary electric motor 1 and the torque generated by the rotary electric motor 1. The electric motor controller 3 therefore understands a deficiency in traction force needed for vehicle acceleration. When the electric motor controller 3 understands the deficiency in traction force needed for vehicle acceleration, the amount of the deficiency in traction force is output to the electromagnet controller 4.

When the amount of the deficiency in traction force is output to the electromagnet controller 4, the electromagnet controller 4 controls the electromagnet apparatus 2 to generate a propulsion force to supplement the deficiency in traction force for vehicle acceleration.

For cases where the electromagnet apparatus 2 is a linear induction motor that uses the rail 200 as a secondary conductor, a propulsion force can be generated without depending upon traction. Further, it is also possible to generate a propulsion force for supplementing the deficiency in traction force for vehicle acceleration by using only the linear inductor motor. However, efficiency is very poor due to the characteristic end effect of linear induction motors.

By using the electric vehicle drive apparatus 10 according to the first embodiment, a main propulsive torque is generated by the rotary electric motor 1, and a deficiency in traction force for vehicle acceleration is generated by using the electromagnet apparatus 2, which is a linear induction motor. The electric vehicle drive apparatus 10 having a higher efficiency than performing drive of the wheels 30 by using only a linear motor can thus be achieved. That is, a high efficiency electric vehicle drive apparatus 10 can be achieved by utilizing a design where a propulsion force generated by the rotary electric motor 1 is larger than a propulsion force generated by the linear induction motor of the electromagnet apparatus 2.

Figure 2:
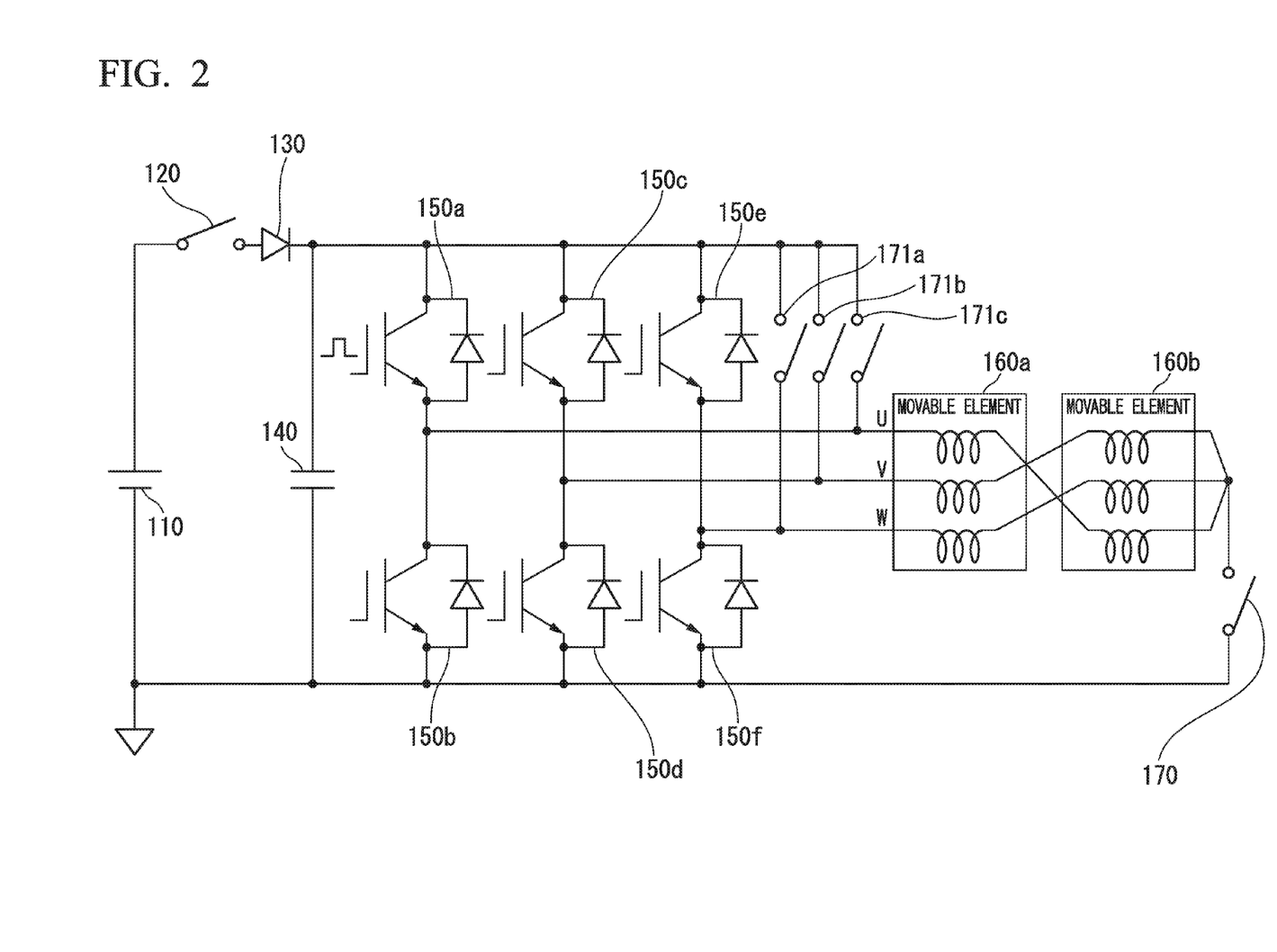
FIG. 2 is a diagram illustrating an example of an inverter circuit for driving a linear induction motor.

FIG. 2 is a diagram illustrating an example of an inverter circuit for driving a linear induction motor.

As FIG. 2 illustrates, a capacitor 140 is connected in parallel to a auxiliary electric power source 110. A switch 120 and a diode 130 are connected between the capacitor 140 and the auxiliary electric power source 110. Two serially connected switching elements 150*a* and 150*b* are connected in parallel with the capacitor 140. Two serially connected switching elements 150*c* and 150*d* are connected in parallel with the switching elements 150*a* and 150*b*. Two serially connected switching elements 150*e* and 150*f* are connected in parallel with the switching elements 150*c* and 150*d*.

A U-phase output terminal 300 at a neutral point between the switching elements 150*a* and 150*b* is connected to a U-phase coil of a movable element 160. A V-phase output terminal 301 at a neutral point between the switching elements 150*c* and 150*d* is connected to a V-phase coil of the movable element 160. A W-phase output terminal 302 at a neutral point between the switching elements 150*c* and 150*d* is connected to a V-phase coil of the movable element 160. A switch 171*a* is connected between the U-phase output terminal 300 and the U-phase coil, and to one end of the switching element 150*e*. A switch 171*b* is connected between the V-phase output terminal 301 and the V-phase coil, and to one end of the switching element 150*e*. A switch 171*c* is connected between the W-phase output terminal 302 and the W-phase coil, and to one end of the switching element 150*e*. Further, end portions of the switches 171*a*, 171*b*, and 171*c* opposite the end portions respectively connected to the U-phase coil, the V-phase coil, and the W-phase coil, are connected together and also connected to a switch 170. Another end of the switch 170 is connected to the switching element 150*f*.

Propulsion force, attraction force, and braking force of a linear induction motor are explained in order below using the circuit of FIG. 2.

The auxiliary electric power source 110 supplies 100 V DC (direct current). A DC voltage on the order of 100 to 600 V, for example, may be created by using the switch 120, the diode 130, and the capacitor 140. Applying the DC voltage to an inverter configured by the switching elements 150*a* and 150*b*, which are controlled by IGBT or the like, allows the inverter to create a three phase AC (alternating current) electric current having a U-phase, a V-phase, and a W-phase. The three phase AC electric current is input to the movable element 160 provided to the electromagnet apparatus 2, which is a linear induction motor, thus generating an electric field between the movable element 160 and the rail 200, which is a static element, FIG. 3 is a diagram illustrating an example of an electric field generated between the movable element 160 provided to the electromagnet apparatus 2 and the rail 200.

Figure 3:
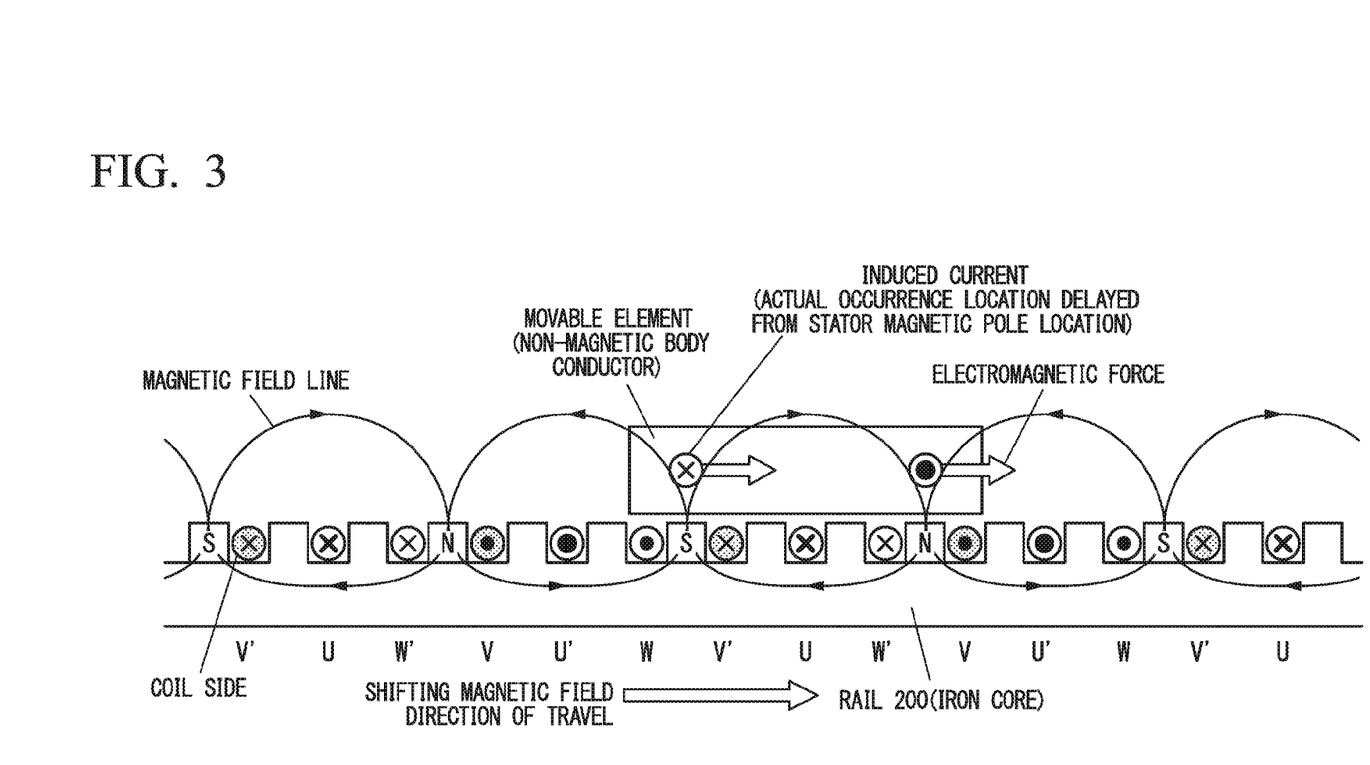
FIG. 3 is a diagram illustrating an example of an electric field generated between a movable element 160, which is provided to an electromagnet apparatus 2, and a rail 200.

As FIG. 3 illustrates, slots may be formed in the rail 200 at equal intervals, for example. Three conductors may be connected in a star pattern to passing from mutually opposite directions for every three shots. Passing a three phase current through the conductors generates a three phase moving magnetic field. N-poles and S-poles appear every three slots in the rail 200. The locations of the N-poles and the S-poles move by three slots per one period of the electric power source frequency. As seen from the relationship between the movable element 160 provided to the electro-magnet apparatus 2 and the rail 200 that acts as a fixed element, an electromagnetic force generated by an induction current becomes a propulsion force.

A second method is explained next. The second method is a method whereby the electromagnet apparatus 2 of the electric vehicle drive apparatus 10 according to the first embodiment generates an attraction force between the rail 200 and the bogie 100. That is, this is a method in which the electromagnet apparatus 2 functions as a linear induction motor, and an axle load toward the rail 200 increases due to an attraction force working toward the rail 200 and generated by the electromagnet apparatus 2.

For example, in FIG. 3 controlling the electric power source frequency and motion of the movable element 160 to be synchronous, an attraction force between the rail 200 and the bogie 100 is generated without generating a torque. In other words, without generating a propulsion force. It is thus possible to easily increase the axle load seen between the wheels 30 and the rail 200 without increasing vehicle body weight. This differs from a general method of actually increasing the axle load by adding weight to the vehicle body.

At this point the electromagnet controller 4 only performs control to increase the attraction force between the rail 200 and the bogie 100, without the linear induction motor outputting a propulsion force in the direction of travel with poor efficiency. The electric motor controller 3 performs control so that rotary electric motor 1 outputs a powering torque at high efficiency. A highly efficient electric vehicle drive apparatus 10 can thus be achieved, similar to that described above.

Note that wheel spin may also be detected and controlled from the electric motor controller 3 when performing attraction force control.

When considering high efficiency drive control, it is preferable to drive the rotary electric motor 1 with as high an efficiency as possible to obtain a traction force, without operating the electromagnet apparatus 2.

When the traction force is low, the adhesion state of the wheels 30 is good, and adhesion between the wheels 30 and the rail 200 is reduced with increasing traction force. The wheels 30 will then experience wheel spin. It is therefore desirable for the electromagnet controller 4 to perform control so that the electromagnet apparatus 2 generates an attractive force between the bogie 100 and the rail 200, and generates a propulsion force in the direction of travel.

Note that adhesion between tread surfaces of the wheels 30 and the rail 200 is dependent upon speed. The electromagnet controller 4 may thus also perform control so as to change the attraction force between the bogie 100 and the rail 200, and the propulsion force in the direction of travel, generated by the electromagnet apparatus 2 in response to the movement speed of the bogie 100.

In practice, the axle load of electric vehicles provided with the bogie 100 ("electric vehicles") differs depending upon rider occupancy. The electromagnet controller 4 may thus also perform control so as to change the attraction force between the bogie 100 and the rail 200, and the propulsion force in the direction of travel, generated by the electromagnet apparatus 2 in response to a load condition.

The electric vehicle drive apparatus 10 according to the first embodiment outputs attraction force commands and propulsion force commands to the electromagnet apparatus 2 in response to a speed range or an output torque of the rotary electric motor 1. The commands are output for cases where a worsened adhesion condition is detected, or where an adhesion condition is expected to worsen, thus allowing the adhesion between the wheels 30 and the rail 200 to increase and assisting the powering torque.

The main electric motor for generating a propulsion force in the direction of travel is the rotary electric motor 1 in the electric vehicle drive apparatus 10 according to the first embodiment. The electric vehicle drive apparatus 10 of the first embodiment can thus produce a propulsion force in the direction of travel with good efficiency. Further, by using the electric vehicle drive apparatus 10 according to the first embodiment, electric motors dispersed among multiple bogies due to adhesion constraints can be aggregated, and vehicle body structure becomes simpler and lower cost. Vehicle body maintenance also becomes easier, and a reduction in cost can be expected. In addition, the number of electric components used in a vehicle body is reduced, and thus a reduction in manufacturing costs can be expected at the same time as an increase in reliability.

By installing the electric vehicle drive apparatus 10 according to the first embodiment in a lead bogie of a lead car, track shunting sensitivity increases. Further, by mounting the electric vehicle drive apparatus 10 according to the first embodiment in a bogie, it can be expected that derailment due to contact with an obstacle on a rail becomes less likely.

Similar actions are basically performed during both deceleration and acceleration. That is, by detecting slippage using the electric motor controller 3, the electromagnet controller 4 controls the electromagnet apparatus 2 to perform regenerative braking assistance. Further, the electromagnet controller 4 controls the electromagnet apparatus 2 to generate an attraction force between the bogie 100 and the rail 200, thus increasing the apparent axle load and increasing the adhesion between the bogie 30 and the rail 200.

By the electromagnet controller 4 providing DC energization to the electromagnet apparatus 2, it becomes possible to control the behavior of the electromagnet apparatus 2 as an eddy current rail brake. By obtaining a braking force from the electromagnet apparatus 2, an electric vehicle can obtain an emergency braking force in addition to an electric brake, a mechanical brake, and the like already provided to the electric vehicle. Braking distance can thus be reduced.

By providing DC energization to the electromagnet apparatus 2, the switches 171a, 171b, and 171c, for example, in the circuit illustrated in FIG. 2 are placed in an electrically connected state (closed). By closing the switches 171a, 171b, and 171c, DC electric power from the auxiliary electric power source 110 excites the movable element 160 through the switch 120, the diode 130, and the switches 171a, 171b, and 171c. A braking force is generated by providing DC excitation to the movable element 160.

Further, the electromagnet controller 4 may also perform control to increase an attraction force generated by the electromagnet apparatus 2 between the bogie 100 and the rail 200 at a specific location. For example, axle load naturally decreases at a gradient section, and therefore the adhesion between the tread surfaces of the wheels 30 and the rail 200 tends to become insufficient. When entering this type of section, the electromagnet controller 4 may perform control to increase the attraction force between the bogie 100 and the rail 200, and increase the propulsion force in the direction of travel, generated by the electromagnet apparatus 2.

An electric vehicle can thus run along a gradient without accelerating or decelerating.

The electric vehicle drive apparatus 10 of an embodiment is thus provided with the rotary electric motor 1, the electromagnet apparatus 2, the electric motor controller 3, and the electromagnet controller 4. The rotary electric motor 1 drives the wheels 30. The electromagnet apparatus 2 generates at least one of an attraction force between the rail 200 and the bogie 100, and a propulsion force. The electric motor controller 3 controls the rotary electric motor 1. The electromagnet controller 4 controls the electromagnet apparatus 2. The rotary electric motor 1 and the electromagnet apparatus 2 are provided on the same bogie 100.

Wheel spin and slippage can thus be controlled when an electric vehicle develops wheel spin or slippage, and a propulsion force can be imparted to the electric vehicle.

Figure 4:
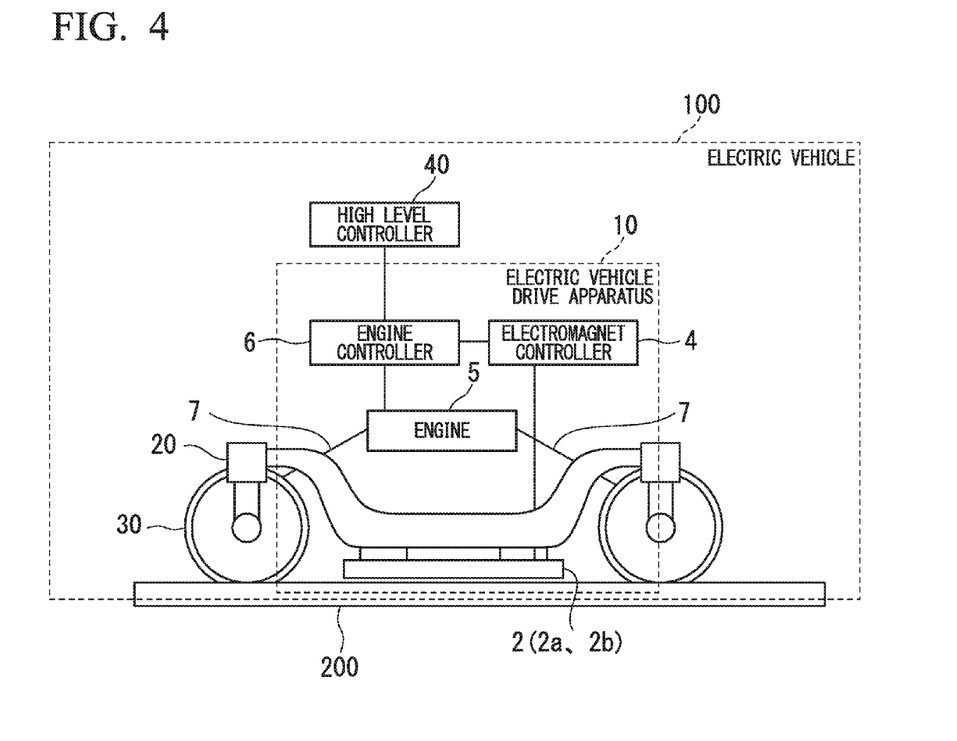
FIG. 4 is a diagram illustrating an example of an electric vehicle drive apparatus 10 according to a second embodiment.

FIG. 4 is a diagram illustrating an example of the electric vehicle drive apparatus 10 according to a second embodiment.

The electric vehicle drive apparatus 10 according to the second embodiment is explained next.

The electric vehicle drive apparatus 10 according to the second embodiment differs from the electric vehicle drive apparatus 10 according to the first embodiment in that the rotary electric motor 1 (the rotary electric motors 1a and 1b) is replaced by an engine 5. Further, the electric motor controller 3 is replaced by an engine controller 6.

A propulsion axle 9 is newly provided between the engine 5 and the wheels 30 to transmit torque from the engine 5 to the wheels 30.

For the electric vehicle drive apparatus 10 provided with the engine 5 controlled by the engine controller 6, response for re-adhesion control when wheel spin or slippage develops is extremely slow due to the response of the engine 5, which may be a diesel engine. Control of the engine 5 by the engine controller 6 therefore has a lower re-adhesion control performance compared to control of the rotary electric motor 1 by the electric motor controller 3.

The electric vehicle drive apparatus 10 according to the second embodiment, by performing control of the electromagnet apparatus 2 by using the electromagnet controller 4 in addition to performing control of the engine 5 by using the engine controller 6, can increase re-adhesion control performance.

The basic principal is similar to that of the electric vehicle drive apparatus 10 according to the first embodiment. The electromagnet controller 4 performs control so that the electromagnet apparatus 2 generates and outputs an attraction force between the bogie 100 and the rail 200, and a propulsion force, when wheel spin or slippage occur.

By using the electric vehicle drive apparatus 10 according to the second embodiment, a high adhesion state can be achieved by transmitting output from the engine 5 directly to the wheels 30, through the propulsion axle 9. For example, a system may be used in which it is necessary to convert output from the engine 5 to electric energy, and drive a rotary electric motor using the electric energy.

Engine efficiency typically depends greatly on the rotational speed of the engine and engine output. By using the electric vehicle drive apparatus 10 according to the second embodiment, the electromagnet controller 4 may control the electromagnet apparatus 2 to output a propulsion force in the direction of travel. By reducing the torque generated by the engine 5, efficiency of the electric vehicle drive apparatus 10 can be increased and fuel consumption can be improved.

The electric vehicle drive apparatus 10 of an embodiment is thus provided with the electromagnet apparatus 2, the electromagnet controller 4, the engine 5, and the engine controller 6. The engine 5 drives the wheels 30. The electromagnet apparatus 2 generates at least one of an attraction force between the rail 200 and the bogie 100, and a propulsion force. The engine controller 6 controls engine 5. The electromagnet controller 4 controls the electromagnet apparatus 2. The engine 5 and the electromagnet apparatus 2 are provided on the same bogie 100.

Wheel spin and slippage can thus be controlled when an electric vehicle develops wheel spin or slippage, and a propulsion force can be imparted to the electric vehicle. Further, by having the electromagnet controller 4 controlling the electromagnet apparatus 2 to output a propulsion force in the direction of travel, torque generated by the engine 5 is reduced, the efficiency of the electric vehicle drive apparatus 10 can be increased, and fuel efficiency can be improved.

The electric vehicle drive apparatus 10 according to a third embodiment is explained next.

The electric vehicle drive apparatus 10 according to the third embodiment has a configuration similar to that of the electric vehicle drive apparatus 10 of the first embodiment.

With the electric vehicle drive apparatus 10 according to the third embodiment, the rotary electric motor 1 and the electromagnet apparatus 2 are mounted to the same bogie 100. The rotary electric motor 1 having good efficiency is used as a main body with the electric vehicle drive apparatus 10 according to the third embodiment. The load of the rotary electric motor 1 therefore naturally becomes larger than that of the electromagnet apparatus 2.

The load factor of the rotary electric motor 1 can therefore be considered to be larger than that of the electromagnet apparatus 2.

In this case the temperature of the rotary electric motor 1 is found by at least one of estimation and detection by a temperature detector such as a thermocouple. The electromagnet controller 4 performs control so that a propulsion force generated by the electromagnet apparatus 2 in the direction of travel increases in response to increases in temperature. The rotary electric motor 1 can thus increase the propulsion force in the direction of travel up to a design temperature limit. In addition, the electromagnet apparatus 2 provides an assist to the propulsion force in the direction of travel for cases where a propulsion force from only the rotary electric motor 1 would exceed a heat rating. A necessary traction force can thus be maintained without exceeding the heat rating.

The electric vehicle drive apparatus 10 of an embodiment is thus provided with the rotary electric motor 1, the electromagnet apparatus 2, the electric motor controller 3, and the electromagnet controller 4. The rotary electric motor 1 drives the wheels 30. The electromagnet apparatus 2 generates at least one of an attraction force between the rail 200 and the bogie 100, and a propulsion force. The electric motor controller 3 controls the rotary electric motor 1. The electromagnet controller 4 controls the electromagnet apparatus 2. The rotary electric motor 1 and the electromagnet apparatus 2 are provided on the same bogie 100.

Wheel spin and slippage can thus be controlled when an electric vehicle develops wheel spin or slippage, and a propulsion force can be imparted to the electric vehicle. Further, a necessary traction force can thus be maintained without exceeding the heat rating.

The electric vehicle drive apparatus 10 according to a fourth embodiment is explained next.

The electric vehicle drive apparatus 10 according to the fourth embodiment has a configuration similar to the electric vehicle drive apparatus 10 of the first embodiment.

Operation of the electric vehicle drive apparatus 10 according to the forth embodiment for cases where the electromagnet apparatus 2 has malfunctioned is explained.

When the electromagnet apparatus 2 of the electric vehicle drive apparatus 10 malfunctions, the electromagnet apparatus 2 cannot be excited, an attraction force between the bogie 100 and the rail 200 cannot be generated, and a propulsion force in the direction of travel cannot be generated.

In this case the electromagnet controller 4 illustrated in FIG. 1 transmits malfunction information to the electric motor controller 3. When malfunction information from the electromagnet controller 4 is input, the electric motor controller 3 reduces a traction force output by the rotary electric motor 1 in order to control wheel spin and slippage. An electric vehicle is thus able to run even while vehicle formation traction performance drops.

Note that multiple electric vehicle drive apparatuses 10 according to the fourth embodiment may exist within a vehicle formation. The burden of outputting a traction force to compensate for the traction force expected to be output by a malfunctioning electromagnet apparatus 2 may then be shared by the electromagnet apparatuses 2 of other electric vehicle drive apparatuses 10.

As a method of sharing the burden, the electromagnet controller 4 may perform control by causing attraction forces to increase between the bogie 100 and the rail 200, which are generated by the electromagnet apparatuses 2 of functional electric vehicle drive apparatuses 10. Increasing a propulsion force in the direction of travel generated by the rotary electric motor 1 to supplement the traction force can be considered.

Further, taking the electromagnet apparatus 2 as a linear induction motor, outputting a propulsion force toward the direction of travel can also be considered as another method of sharing the burden.

Even if the electromagnet apparatus 2 malfunctions, using the above methods to share the generation of traction force between functioning electric vehicle drive apparatuses 10 allows an electric vehicle to accelerate.

The electric vehicle drive apparatus 10 of an embodiment is thus provided with the rotary electric motor 1, the electromagnet apparatus 2, the electric motor controller 3, and the electromagnet controller 4. The rotary electric motor 1 drives the wheels 30. The electromagnet apparatus 2 generates at least one of an attraction force between the rail 200 and the bogie 100, and a propulsion force. The electric motor controller 3 controls the rotary electric motor 1. The electromagnet controller 4 controls the electromagnet apparatus 2. The rotary electric motor 1 and the electromagnet apparatus 2 are provided on the same bogie 100.

Wheel spin and slippage can thus be controlled when an electric vehicle develops wheel spin or slippage, and a propulsion force can be imparted to the electric vehicle. Even if the electromagnet apparatus 2 malfunctions, sharing the generation of traction force between functioning electric vehicle drive apparatuses 10 allows an electric vehicle to accelerate.

Figure 5:
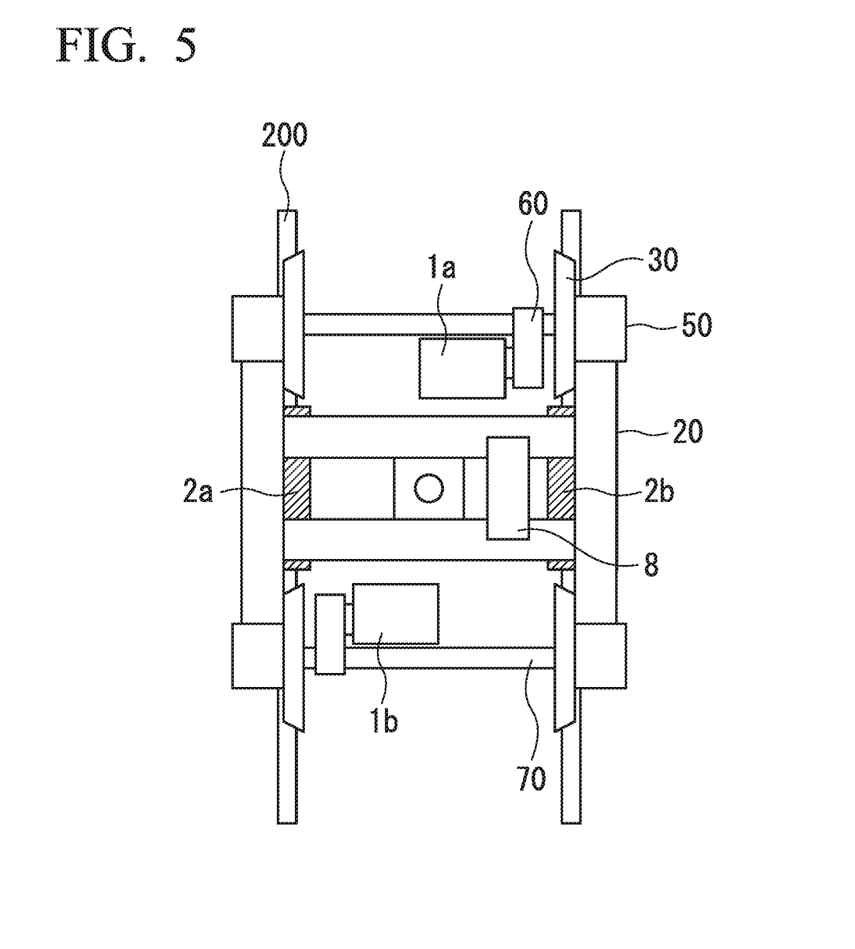
FIG. 5 is a diagram illustrating an example of a bogie 100 on which an electric vehicle drive apparatus 10 according to a fifth embodiment is provided.

FIG. 5 is a diagram illustrating an example of the bogie 100 on which the electric vehicle drive apparatus 10 according to a fifth embodiment is provided.

The bogie 100, on which the electric vehicle drive apparatus 10 according to the fifth embodiment is provided, is explained next.

FIG. 5 is an illustration of the bogie 100 seen from directly above.

Elements not seen from a side of the bogie 100 according to the first embodiment and illustrated in FIG. 1 are visible when the bogie 100 is viewed from above.

The bogie 100 is provided with the rotary electric motor 1, the electromagnet apparatus 2, the bogie frame 20, the wheels 30, an axle box 50, a gear apparatus 60, and an axle 70.

The electric vehicle drive apparatus 10 is provided with the rotary electric motor 1 and the electromagnet apparatus 2.

Note that there are two rotary electric motors 1 present, the rotary electric motor 1*a* and the rotary electric motor 1*b*, and each drives a different wheel.

Further, there are two electromagnet apparatuses 2 present, the electromagnet apparatus 2*a* and the electromagnet apparatus 2*b*. The electromagnet apparatus 2*a* is provided on a left side in the direction of travel, and the electromagnet apparatus 2*b* is provided on a right side in the direction of travel.

Operation of the electric vehicle drive apparatus 10 is explained here for a case where an electric vehicle is traveling over a curved section where the rail 200 curves toward the left in the direction of travel.

A traveling location detector 8, such as a GPS, a transponder, or a device that measures a number of wheel rotations, for example, detects that the electric vehicle is entering the curved section. The electromagnet controller 4 then controls attraction forces between the bogie 100 and the rail 200, and propulsion forces in the direction of travel, generated by each of the electromagnet apparatus 2*a* and the electromagnet apparatus 2*b*, based on a database containing a radius of curvature, cant, gradient, and the like for the actual curve.

Specifically, for cases where the electric vehicle enters a left curve section, the electromagnet controller 4 controls the attraction force between the bogie 100 and the rail 200 generated by the electromagnet apparatus 2*a* to be larger than that generated by the electromagnet apparatus 2*b*. When the electromagnet controller 4 controls the propulsion force in the direction of travel generated by the electromagnet apparatus 2, the electromagnet controller 4 performs control so that the propulsion force in the direction of travel from the electromagnet apparatus 2*b* is larger than that from the electromagnet apparatus 2*a*.

Note that the electromagnet controller 4 may also control the electromagnet apparatus 2*a* to output a propulsion force in a direction opposite to that of the direction of travel when the electric vehicle enters a sharp curve.

Stability for an electric vehicle that travels over a curved section is typically ensured by making the wheels 30 traveling on an outside of the curve travel over a longer distance utilizing a wheel size difference in the wheels 30.

By using the electric vehicle drive apparatus 10 according to the fifth embodiment, the bogie 100 itself can be given a self-steering function. The turning performance of the bogie 100 improves, flange wear is reduced, high frequency noise when the bogie 100 passes through a curved section is reduced. In addition, excessive lateral force on the wheels is reduced, which can contribute to helping prevent physical derailment and the like.

The electric vehicle drive apparatus 10 of an embodiment is thus provided with the rotary electric motor 1, the electromagnet apparatus 2, the electric motor controller 3, and the electromagnet controller 4. The rotary electric motor 1 drives the wheels 30. The electromagnet apparatus 2 generates at least one of an attraction force between the rail 200 and the bogie 100, and a propulsion force. The electric motor controller 3 controls the rotary electric motor 1. The electromagnet controller 4 controls the electromagnet apparatus 2. The rotary electric motor 1 and the electromagnet apparatus 2 are provided on the same bogie 100.

Wheel spin and slippage can thus be controlled when an electric vehicle develops wheel spin or slippage, and a propulsion force can be imparted to the electric vehicle. Further, the turning performance of the bogie 100 improves, flange wear is reduced, high frequency noise when the bogie 100 passes through a curved section is reduced. In addition, excessive lateral force on the wheels is reduced, which can contribute to helping prevent physical derailment and the like.

The electric vehicle drive apparatus 10 according to a sixth embodiment is explained next.

The electric vehicle drive apparatus 10 according to the sixth embodiment has a configuration similar to that of the electric vehicle drive apparatus 10 of the first embodiment.

Operation of the electric vehicle drive apparatus 10 according to the sixth embodiment is explained.

When driving an electric vehicle using a drive system that is powered by DC current received from an external overhead wire or a rail, an excess power absorbing apparatus such as a load capable of accepting sufficient line power, an inverter, or the like must be present in the area during regenerative braking. If an excess power absorbing apparatus is not present, the voltage at an electric vehicle regenerating DC powering point will increase, and an operation is performed to lower the regenerative current to protect equipment occurs.

With the electric vehicle drive apparatus 10 according to the sixth embodiment, the electromagnet apparatus 2 is provided with DC energization and used as an eddy current brake and a linear induction motor. By doing at least one of injecting reactive power or increasing secondary side copper loss, a braking force during braking is maintained.

Typically, for cases where there is no excess power absorbing apparatus present, a mechanical brake operates along with increasing voltage at an electric vehicle regenerating DC powering point, and ride quality will worsen due to shocks during mechanical operation. Further, mechanical brake wear will occur during mechanical brake operation.

By using the electric vehicle drive apparatus 10 of the sixth embodiment and having the electromagnet controller 4 control the electromagnet apparatus 2 to generate an attraction force between the rail 200 and the bogie 100, a brake can be applied with better controllability than when using a mechanical brake. Further, poor ride quality can be improved, and mechanical brake wear can be reduced.

The electric vehicle drive apparatus 10 according to the sixth embodiment is explained above for a case of using a feed system for supplying DC power. However, use of a feed system for supplying AC power is similar. For example, when an electric vehicle crosses an AC section, a momentary loss of electric power occurs while passing through the section. Continuing to apply braking under such conditions results in loss of electric braking, and a switch over to mechanical braking is made.

By operating the electric vehicle drive apparatus 10 as a temporary eddy current rail brake for such cases, similarly good ride quality and reduced brake shoe wear due to mechanical braking can be expected.

The electric vehicle drive apparatus 10 of an embodiment is thus provided with the rotary electric motor 1, the electromagnet apparatus 2, the electric motor controller 3, and the electromagnet controller 4. The rotary electric motor 1 drives the wheels 30. The electromagnet apparatus 2 generates at least one of an attraction force between the rail 200 and the bogie 100, and a propulsion force. The electric motor controller 3 controls the rotary electric motor 1. The electromagnet controller 4 controls the electromagnet apparatus 2. The rotary electric motor 1 and the electromagnet apparatus 2 are provided on the same bogie 100.

Wheel spin and slippage can thus be controlled when an electric vehicle develops wheel spin or slippage, and a propulsion force can be imparted to the electric vehicle. Further, good ride quality and reduced brake shoe wear due to mechanical braking can be expected.

The electric vehicle drive apparatus 10 according to a seventh embodiment is explained next.

The electric vehicle drive apparatus 10 according to the seventh embodiment has a configuration similar to that of the electric vehicle drive apparatus 10 according to the first embodiment.

Another method of increasing adhesion force is discussed for the electric vehicle drive apparatus 10 of the seventh embodiment.

Wheel spin and slip of the wheels 30 readily occurs in accumulated snowfall, and is often seen in winter. This is because friction between the rail 200 and the wheels 30 drops drastically due to changes in the viscosity of moisture adhering to a surface of the rail 200 according to temperature.

At least one of an outside air temperature detector device and a mode setter that switches a mode according to reductions in outside temperature is provided to the electric vehicle drive apparatus 10 of the seventh embodiment. The electromagnet apparatus 2 may excite the rail 200 while the electric vehicle is traveling, thus heating the rail 200, when at least the detector detects that the outside temperature has dropped, or an operator sets a mode by using the mode setter.

The electromagnet apparatus 2 may heat the rail 200 by using an eddy current acting as an eddy current brake through DC excitation. Alternatively the electromagnet apparatus 2 may be operated to perform excitation control as a linear inductor motor, and the rail 200 may be heated by generating reactive power and increasing secondary side copper loss.

By using the electric vehicle drive apparatus 10 according to the seventh embodiment, the temperature of the rail 200 can be increased, and the temperature of moisture adhering to a surface of the rail 200 can be increased. Further, the viscosity of moisture decreases with increased moisture temperature, and adhesion between the wheels 30 and the rail 200 thus improves.

Note that an outside temperature detector may also function to directly measure the temperature of a surface of the rail 200.

The electric vehicle drive apparatus 10 of an embodiment is thus provided with the rotary electric motor 1, the electromagnet apparatus 2, the electric motor controller 3, and the electromagnet controller 4. The rotary electric motor 1 drives the wheels 30. The electromagnet apparatus 2 generates at least one of an attraction force between the rail 200 and the bogie 100, and a propulsion force. The electric motor controller 3 controls the rotary electric motor 1. The electromagnet controller 4 controls the electromagnet apparatus 2. The rotary electric motor 1 and the electromagnet apparatus 2 are provided on the same bogie 100.

Wheel spin and slippage can thus be controlled when an electric vehicle develops wheel spin or slippage, and a propulsion force can be imparted to the electric vehicle. Further, adhesion between the wheels 30 and the rail 200 can be improved.

The electric vehicle drive apparatus 10 according to at least one of the embodiment described above can control wheel spin and slip on an electric vehicle, and can impart a propulsive force on an electric vehicle.

Embodiments have been explained above, but an inside portion of the electric vehicle drive apparatus 10 may include a computer system. Processes described above may be stored in a computer readable recording medium in a program format, and the processes described above may be performed by the computer reading and executing the program. The term computer readable recording medium as used here means a magnetic disk, an optical disk, a CD=ROM, a DVD-ROM, a semiconductor memory, or the like. Further, the computer program may also be sent a computer by using a communication line, and the receiving computer may execute the program.

The program may also be used to achieve a portion of the functions described above. In addition, a program may be combined with another program already stored in a computer system and executed, namely a difference file (differential program).

Several embodiments of the present invention are explained above. These embodiments are presented as examples, and are not intended to limit the scope of the invention. It is possible to implement a variety of other embodiments. Various omissions, substitutions, and changes that do not depart from the gist of the invention can be made. The embodiments and changes thereto are included in the scope and the gist of the invention, and are included in the invention as described by the scope of patent claims and equivalents thereto.

What is claimed is:

1. An electric vehicle drive apparatus which controls wheel spin or wheel slip on a rail, comprising:
    a rotary electric motor that drives at least one wheel;
    at least one electromagnet apparatus that generates at least one of an attraction force between the rail and a bogie, and a propulsion force;
    an electric motor controller that controls the rotary electric motor;
    an electromagnet controller that controls the at least one electromagnet apparatus; and
    a wheel state detector device that performs at least one of detecting wheel spin and detecting wheel slip,
    wherein the rotary electric motor and the at least one electromagnet apparatus are provided on the same bogie, and
    wherein the electromagnet controller controls the at least one electromagnet apparatus to increase the attraction force generated between the rail and the at least one wheel to control wheel spin or wheel slip on the rail when the wheel state detector device detects wheel spin or wheel slip.

2. The electric vehicle drive apparatus according to claim 1, wherein the electromagnet controller performs at least one of:
    controlling the electric motor controller to generate a positive propulsion force for accelerating in a direction of travel; and
    controlling the electric motor controller to generate a negative propulsion force for decelerating in the direction of travel.

3. The electric vehicle drive apparatus according to claim 2, wherein the electric motor controller controls the rotary electric motor to generate an output larger than an output generated by the at least one electromagnet apparatus.

4. The electric vehicle drive apparatus according to claim 1, wherein the electromagnet controller controls the electromagnet controller to generate a positive propulsion force for accelerating in a direction of travel when the wheel state detector device detects wheel spin, and the electromagnet controller controls the electric motor controller to generate a negative propulsion force for decelerating in the direction of travel when the wheel state detector device detects wheel slip.

5. The electric vehicle drive apparatus according to claim 1, further comprising:
a traveling location detector device that detects a traveling location during traveling,
wherein the electromagnet controller controls the at least one electromagnet apparatus to generate the attraction force between the rail and the wheel in a case that the traveling location detector device detects that the traveling location is a specific traveling section.

6. The electric vehicle drive apparatus according to claim 5, wherein two electromagnet apparatuses are provided along the rail on the same bogie, and the electromagnetic controller controls the two electromagnetic apparatuses to change two respectively generated attraction forces in a case that the traveling location detector device detects that the traveling location is a curved section.

7. The electric vehicle drive apparatus according to claim 1, wherein the electromagnet controller controls a magnitude of the attraction force generated by the at least one electromagnet apparatus, based on at least one of a rotary speed of the rotary electric motor and a relative speed between the rail and the bogie.

8. The electric vehicle drive apparatus according to claim 1, wherein the electromagnet controller controls the at least one electromagnet apparatus to increase the attraction force generated by the at least one electromagnet apparatus in a case that a traction force output by the bogie becomes larger than a predetermined value, and the electromagnet controller controls the at least one electromagnet apparatus to decrease the attraction force generated by the at least one electromagnet apparatus in a case that the traction force output by the bogie becomes smaller than a predetermined value.

9. The electric vehicle drive apparatus according to claim 1, wherein the electromagnet controller controls the at least one electromagnet apparatus to increase a positive propulsion force from the at least one electromagnet apparatus for accelerating in a direction of travel in a case that at least one of a rotary speed of the rotary electric motor during acceleration, and a relative speed between the rail and the bogie, increases, and the electromagnet controller controls to increase a negative propulsion force from the at least one electromagnet apparatus for decelerating in the direction of travel in a case that at least one of a rotary speed of the rotary electric motor during deceleration, and the relative speed between the rail and the bogie, decreases.

10. The electric vehicle drive apparatus according to claim 1, wherein the electromagnet controller controls to increase a positive propulsion force from the at least one electromagnet apparatus for accelerating in a direction of travel in a case that a traction force output from the bogie becomes larger than predetermined value, and the electromagnet controller performs control to increase a negative propulsion force from the at least one electromagnet apparatus for decelerating in the direction of travel in a case that the traction force output from the bogie becomes smaller than a predetermined value.

11. The electric vehicle drive apparatus according to claim 1, further comprising:
a load detector device that detects a load on a wheel included in the at least one wheel,
wherein the electromagnet controller controls the at least one electromagnet apparatus to change a magnitude of the attraction force generated by the at least one electromagnet apparatus, based on the load on the wheel detected by the load detector device.

12. The electric vehicle drive apparatus according to claim 1, further comprising:
a first temperature detector device that detects a temperature of the rotary electric motor,
wherein the electromagnet controller controls the at least one electromagnet apparatus to: during acceleration, increase a positive propulsion force from the rotary electric motor for accelerating in a direction of travel, and during deceleration, increase a negative propulsion force from the rotary electric motor for decelerating in the direction of travel, in a case that the first temperature detector device detects an increase in the temperature of the rotary electric motor.

13. The electric vehicle drive apparatus according to claim 1, further comprising:
a first malfunction detector device that detects at least one of a malfunction of the rotary electric motor and a malfunction of the electric motor controller,
wherein the electromagnet controller controls the at least one electromagnet apparatus to increase a negative propulsion force from the at least one electromagnet apparatus for decelerating in a direction of travel in a case that the first malfunction detector device detects at least one malfunction from the rotary electric motor or from the electric motor controller.

14. The electric vehicle drive apparatus according to claim 1, further comprising:
a second malfunction detector device that detects at least one of a malfunction of the at least one electromagnet apparatus and a malfunction of the electromagnet controller,
wherein the electric motor controller controls the at least one electromagnet apparatus to reduce torque generated by the rotary electric motor in a case that the second malfunction detector device detects a malfunction in at least one of the at least one electromagnet apparatus and in the electromagnet controller.

15. The electric vehicle drive apparatus according to claim 1, wherein the at least one electromagnet apparatus is a linear induction motor that uses the rail as a secondary conductor, and the electromagnet controller controls the at least one electromagnet apparatus to increase a reactive power output in a case that there is an increase in voltage on a direct current voltage unit provided to the electric motor controller for controlling the rotary electric motor.

16. The electric vehicle drive apparatus according to claim 1, further comprising:
a second temperature detector device that detects at least one of an outside temperature and a temperature of the rail,
wherein the electromagnet controller controls the at least one electromagnet apparatus to heat the rail depending upon the temperature detected by the second temperature detector device.

* * * * *